US012623760B2

(12) United States Patent
Price et al.

(10) Patent No.: US 12,623,760 B2
(45) Date of Patent: May 12, 2026

(54) RECREATIONAL DIVING BUOY AND SAFETY SYSTEM

(71) Applicants: Christopher Price, Santa Rita, GU (US); Lee Shannon, Kaneohe, HI (US); Paul Leary, Salinas (DE)

(72) Inventors: Christopher Price, Santa Rita, GU (US); Lee Shannon, Kaneohe, HI (US); Paul Leary, Salinas (DE)

( * ) Notice: Subject to any disclaimer, the term of this patent is extended or adjusted under 35 U.S.C. 154(b) by 81 days.

(21) Appl. No.: 18/035,679

(22) PCT Filed: Oct. 29, 2021

(86) PCT No.: PCT/US2021/057371

§ 371 (c)(1),
(2) Date: May 5, 2023

(87) PCT Pub. No.: WO2022/098582

PCT Pub. Date: May 12, 2022

(65) Prior Publication Data

US 2023/0406468 A1 Dec. 21, 2023

(51) Int. Cl.

*B63C 11/26* (2006.01)
*B63B 22/04* (2006.01)
*B63B 45/04* (2006.01)
*H01Q 1/34* (2006.01)

(52) U.S. Cl.

CPC .............. *B63C 11/26* (2013.01); *B63B 22/04* (2013.01); *B63B 45/04* (2013.01); *H01Q 1/34* (2013.01)

(58) Field of Classification Search

CPC ......... B63B 22/00; B63B 22/04; B63B 22/08; B63B 22/18; B63C 11/00; B63C 11/02; B63C 11/26

USPC ...... 441/1, 6, 11, 12, 13, 20, 21, 22, 23, 24, 441/25, 26, 33

See application file for complete search history.

(56) References Cited

U.S. PATENT DOCUMENTS

| | | | | |
|---|---|---|---|---|
| 832,881 | A | | 10/1906 | Skinner |
| 3,048,814 | A | | 8/1962 | Francois |
| 3,597,778 | A | * | 8/1971 | Castelliz ................ B63B 22/20 441/25 |
| 3,961,559 | A | | 6/1976 | Teramachi |
| 4,238,864 | A | | 12/1980 | Kealoha |
| 4,493,664 | A | * | 1/1985 | Dale ..................... B63B 22/003 367/4 |
| 2014/0162509 | A1 | | 6/2014 | Harrington |
| 2015/0116496 | A1 | | 4/2015 | Ottaviano et al. |

OTHER PUBLICATIONS

International Search Report and Written Opinion for priority application PCT/US21/56361 issued on Jun. 7, 2022.

* cited by examiner

*Primary Examiner* — Daniel V Venne

(74) *Attorney, Agent, or Firm* — William Gray Mitchell

(57) ABSTRACT

A diving safety system comprising a floatation buoy acting as a diving line spool, a slip ring within the buoy containing components of a wired and/or wireless electrical communication system allowing an underwater diver to communicate with a boat or shore-based persons, with a method of use.

8 Claims, 9 Drawing Sheets

RECREATIONAL DIVING BUOY AND SAFETY SYSTEM

CROSS REFERENCE TO RELATED APPLICATIONS

This patent application claims priority to U.S. Provisional Patent Application 63/110,859, filed on Nov. 6, 2020.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a recreational diving buoy and safety system.

Background of the Invention

Various diving safety systems, including buoy-dependent systems, are well known in the SCUBA diving community. In particular, surface marker buoys are required equipment for warning boaters of divers down and also to help in retrieval location. Such buoys often carry a "diver down" red and white flag with marker lights for high visibility. Additional safety equipment may also be placed on such buoys to aid divers after surfacing, such as whistles or air horns, a line and reel, or even a small inflatable float.

Dive lines running from the surface to the bottom are also known safety features to aid submerged divers in maintaining their orientation and allowing them to resurface at or near the exact point of entry. These lines also assist divers in maintaining safe descent and ascent rates. Today, such lines typically run from a dive boat. While mooring buoys are well known for anchoring boats, the concept of a mobile or deployable mooring buoy for use in diving has typically been relegated to a common spherical or similar buoy style, attached to a rope with a shot weight or similar form of anchorage. Another common style buoy is known as a sausage, consisting of a long cylindrical inflatable sometimes with the words "Diver Below" printed on the material.

Similarly, while available diving buoys are known to employ certain electronic devices such as LED lights for visibility, there is currently no buoy available to serve as an actual communications hub for diver(s) and personnel afloat or ashore, either in the event of an emergency or otherwise.

What is needed is a single buoy that can simultaneously serve as a mobile location marker, dive line reel and, optionally, a buoy-based or separate communications hub for divers wishing to signal third parties above water and/or to communicate among divers.

DETAILED DESCRIPTION OF THE INVENTION

Figure 1:
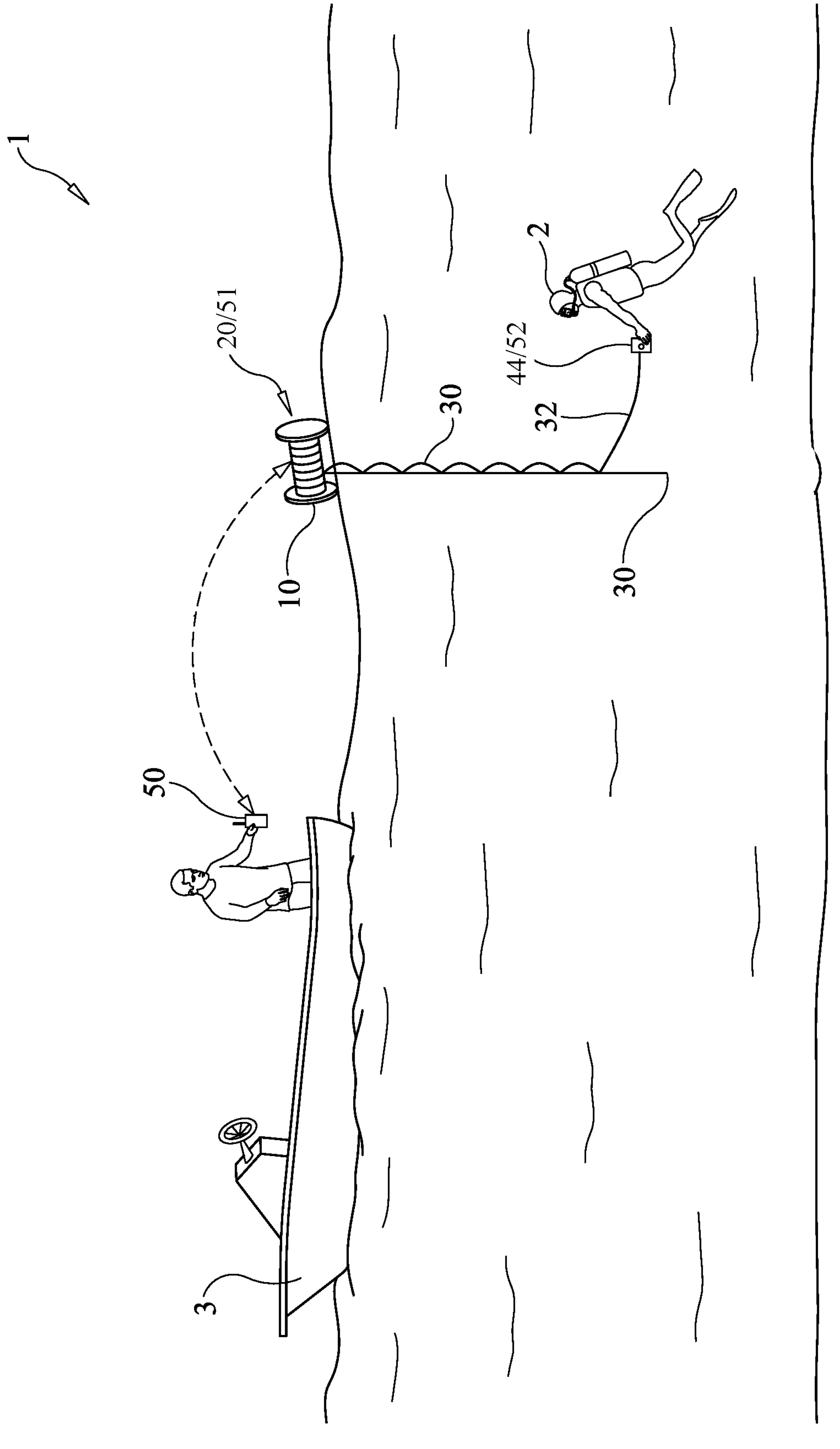
FIG. 1 is a line drawing evidencing an embodiment of a diving safety system comprising a flotation buoy, underwater communication line (contained within the underwater tending line) and transmission to a boat-based receiver.

The invention comprises a safety device and system for use in recreational diving and diving instruction, allowing a submerged diver to signal a person(s) on the surface or shore, or, in certain embodiments, other divers. Several iterations are disclosed, including the transmission of acoustic signals, wireless signals in the RF spectrum, and wired signals from the diver to the surface.

In a basic embodiment, the system comprises a flotation buoy that also acts as a diving line spool or reel, paying out an underwater tending line and optional underwater communication line as the diver descends. The underwater communication line could either be attached externally to the tending line or run through the center core of the tending line, be separated but secured to the tending line as in FIG. 5, or be completely separated as in FIG. 6. As with most known buoys, the flotation buoy will be constructed of some combination of rubber, plastic and/or fiberglass, likely overlaying an interior of foam and/or air to increase buoyancy.

Some structural parts could have metal components to add robustness if needed. The line is retrieved manually when the diver is ascending at the end of the dive using an attached reel or other similar tool. The underwater line will be high-strength buoyant hollow-braid construction such as, without limitation, Amsteel™ or a similar Dyneema®-based product. Link 2 is formed by 2-4 wires, strain-relieved by a strength member, and routed inside the hollow braid of the line itself. In an alternate embodiment, high-grade austenitic stainless steel braid could be used, as well as known alloys such as Monel 400, Iconel 825 and nitronic 32. In less stressful environments, waterproof materials with buoyancy characteristics such as rubber, synthetic rubber, polypropylene or polyethylene may be appropriate.

Conductors include power and ground, as well as bi-directional communications. Communications through wires will be a serial protocol, where logic levels, data rates and signal-encoding are optimized for long-wire transmission. A low-power microcontroller circuit at each end of the communications link will transmit and receive the communications signal over link 2. The microcontroller in node 2 will interface between the wired serial communication to node 3 and the RF communication to node 1. The microcontroller at node 3 will interface between the wired serial communication to node 2, and inputs from the diver.

Arranged within the buoy is a hollow into which a slip ring may be placed. The insert could also be a hollow compartment made of plastic, fiberglass, metal, or some other suitable material with a watertight seal to contain electronic communication components. Regardless of material, the insert is waterproof and contains electrical communication components for allowing the diver to communicate bi-directionally with third parties above water and vice versa. Such components may optionally include a radio or other communication signal transmission device capable of broadcasting a distress or other signal in the air from the buoy after being triggered by the diver below. Such transmission devices may utilize a private channel and be paired with a receiver on a boat or on shore or be set to broadcast over a public frequency in accordance with local laws and regulations. In an alternate embodiment, the electrical communication components may comprise a wired connection with a person ashore, or onboard a boat or nearby surface platform, allowing for a private, wired transmission.

Specifications for the flotation buoy will vary based on expected conditions, depth of the water, amount of line required and size of the electronic communications equipment. Length of the entire buoy is expected to run between 50 and 150 cm, with a preferred range of 70-90 cm and an ideal length of approximately 82 cm. Width of each cap is expected to run between 10 and 20% of the entire length of the buoy, with an ideal width of approximately 13 cm. Length of the stem is expected to run between 60 and 80% of the entire length of the buoy, with an ideal length of approximately 56 cm. The end caps of the flotation buoy could be in other shapes besides a teardrop, such as a rectangle, oval, triangle, or another shape that provides the functionality to limit undesired unspooling of the tending line (and/or communications line in certain embodiments).

As described, the flotation buoy will serve both as a reel for diving and/or underwater communications line, as well as a communications hub for divers wishing to signal or speak to third parties above water at a distance. The relatively small size and weight of the buoy will make it easy to move, deploy and retrieve with each dive and the reel function will obviate the need to attach, detach and coil line in the water or on a boat deck. In other embodiments, the communications hub may exist on a separate floation as in FIGS. 2, 3, 4, and 6, which could either be detached or attached to the primary floation buoy.

Ideally, the buoy will be tethered to a second floating device, embodied as a surface marker buoy for purposes of aiding third parties in quickly locating the dive site. As with the flotation buoy, the floating container will again utilize known buoyancy design. Ideally, it will contain one or more types of location determination aids, such as a dive flag elevated on a pole over the water, a strobe, an audio alarm or siren, and a GPS location device. In some cases, an electronically activated flare or smoke signal could be utilized to aid in surface diver location. If the surface marker buoy includes a GPS device, the tether between the two buoys may include a communication line whereby the GPS location information from the surface marker buoy may be broadcast via the radio or other communication components located within the flotation buoy. Optionally, a waterproof antenna will extend from the communication components, through the body of the buoy and into the open air.

In the wired version of the system, the diver will be provided with one or more "panic button" devices that, when triggered, will send a wired distress signal to the flotation buoy. In the wireless version of the system, the diver will be provided with a similar "panic button" device that, when triggered, will send a wireless signal to the flotation buoy. Ideally, panic buttons may be placed in easy-to-reach locations such as at the diver's shoulder, belt, upper arm, front waist, and/or adjacent to the diver's oxygen regulator or flow meter. In one iteration, the panic button may be more than one button, color coded and each indicating a different level of criticality. For example, a yellow button could indicate that the diver requires help within 20 minutes, whereas a red button could indicate that help is required immediately. Alternate signals could also be provided specifying certain types of equipment or safety issues. On the diver's side these signals may be selected from a list of pre-programmed messages, indicating a number possible common communication needs, such as operational status messages.

In one embodiment of a diver's interface to such a system, the selection of preset signals could be done from a large, easily manipulated rotary encoder knob with momentary button on a wrist-mounted computer, or a D-ring attached handheld console, with a small view screen for selection of messages, and reading of received messages. With an interface such as this, it could be possible to send custom text message text using a knob-based character selection interface, and/or allow a user to upload custom pre-programmed messages for common communications needs.

In another embodiment of a diver's interface, the selection of preset signals could be done from a keyboard system, or text could be produced underwater with the keyboard for a custom message created during a dive, followed by transmission. Other embodiments could include manufacturer-provided preset messages, touch screen interfaces that include either keyboards or preset messages, or some other combination of buttons, rotary encoder knobs, switches, or touch screens for messages to be produced before or during a dive.

When the diver is using a full face dive mask or similar equipment including a microphone, the wired panic button will be paired with an audio link allowing the diver to transmit voice messages. When available, such voice messages may be further relayed to listening parties' receivers by the electrical communication components of the flotation buoy.

In another alternate embodiment, the foam (or other material) insert (or separate floation buoy) will contain an interface to a fully submerged acoustic modem paired with another acoustic modem on the diver's body. If multiple divers are utilizing the modem then each diver could have a transceiver (and/or panic buttons or similar interfaces). Known subsea acoustic modems are able to transmit positional and algorithmic data, as well as voice data. Such modems are available with a variety of transmission speeds, depth and distance ratings.

Once an embodiment which involves acoustic modems exists it will be possible to provide communications amongst divers, as well as to the surface station. Diver messages may need to be routed through the central modem, which will be moored to the buoy, before being routed to additional modems used by other divers. Each modem, be it on a diver or the buoy, would be given an address, and messages may be directed to a specific address, or to all (such as in an emergency team-recall scenario). Each modem is capable of recognizing the address in a message header, and only messages for the modem's local address will be deciphered.

The underwater line will ideally terminate in an anchor that will be placed at the sea floor. For areas where anchorage is not possible, a plastic or fabric drogue may be employed as a sea anchor to provide a level of stability and prevent quick movement of the buoy and line. In other versions of an anchor, a bag could be used to fill with sediment, rocks, or other heavy items from the seabed.

In a further possible embodiment, the communications system hardware may be packaged separately from the specific floatation buoy described herein, and instead packaged with a standard commercially available floatation container or attachment and line. In this case, the communications system (wireless RF communications through-air, wired communications to depth, and acoustic communications through water), could be packaged as a stand-alone device to be integrated with any existing buoy or mooring, to enable communications with a submerged diver from the surface, irrespective of the specific floatation buoy in this document. Similarly, each component could be packaged and sold separately for either system customization, market demand for particular portions of the overall system, or for replacement.

The electrical communication components located in the slip ring of the flotation buoy will primarily consist of a microcontroller and/or digital logic circuit with two interfaces, one for the communications link to the submerged diver, and one for the communications link to the boat or shore station. The communications link to the submerged diver will be a wired serial protocol, terminating either at the hardware carried directly by the diver, or at an acoustic modem. The communications link to the boat/shore station will consist of a digital (for transmission/receipt of digital data) and possibly analog (for transmission/receipt of audio messages or alarms) inputs and outputs to a radio frequency transceiver circuit, which modulates and demodulates digital and analog signals into a carrier signal in the VHF or ISM frequency bands. The electronics package inside the buoy itself serves primarily as a communications relay, or repeater. That is, it simply receives data on one interface and repeats it on another. The power supply for the electronics package inside the buoy may comprise one or more batteries, optionally supplemented with solar panels. The primary interpretation of that information is at the endpoints, the diver and the shore station. Signals received from diver(s) or boat/shore could also initiate a strobe, audible, or other signal to facilitate in localization at the surface.

Node 1 refers to the user interface system utilized on a boat or ashore from a surface operator. Node 2 refers to the transceiver at the water surface, preferably in a slip ring, that assists with the relay of communications between the boat and the diver. Node 3 refers to the device that is submerged—either with a diver, on an anchor chain, or otherwise underwater. The communications link, referred hereafter as link, between node 1 and node 2 is link 1. The link between node 2 and node 3 is link 2.

Node 3 is an electronic device that is attached to a diver, at the bottom of an anchored buoy chain or line, or otherwise submerged based on the embodiment for a particular dive. It is used to allow a submerged diver to communicate to the surface—either to send a distress signal or other communication or message.

Link 1 consists of radio frequency (RF) half-duplex communications between node 1 (boat/ashore) and node 2 (surface/slip ring), generally in either the ISM or VHF radio bands. Preferably, the link would utilitze either the ISM (e.g. 433 or 915 MHz) and/or non-commercial VDSMS VHF (e.g. 156.425-156.625 MHz) radio bands.

Link 2 consists of two embodiments: (1) wired full-duplex communications or (2) acoustic half-duplex communication. This link sends information between node 2 at the surface and the diver (or otherwise submerged node 3).

DETAILED DESCRIPTION OF THE FIGURES

FIG. 1 shows one embodiment of the disclosed diving safety system comprising a flotation buoy 10 acting as a surface marker buoy 20. The flotation buoy 10 acts as a reel, paying out an underwater line 30 running downward to be handled by diver 2 and terminating at the sea floor at anchor 36. Attached to the underwater line 30 is an underwater communication line 32 connecting to a diver interface 44/Node 3 52 held or worn by the diver. The connection between the flotation buoy and anchor will both allow the floating components to stay in place and provide diver 2 a point of reference and means of reaching the surface exactly at the flotation buoy.

Also pictured on the surface is node 1 50, embodied as a third party transceiver on a boat 3, shown receiving a wireless transmission from the electronics Node 2 51 (not pictured) inside of the flotation buoy, such transmission shown as a dotted line.

In another embodiment, also not pictured, a hollow inside the flotation buoy could be covered with a foam cover overlaying a plastic underside with screw threads corresponding to a similar threaded plastic interior of the buoy to hold the insert in place and ensure a water-tight fit. In an alternate embodiment shown in FIGS. 2, 3, 4, and 6, the electronic communications equipment is inside a separate flotation buoy 20 and electrically connected to the primary flotation buoy 10 via a slip ring 11.

Figure 2:
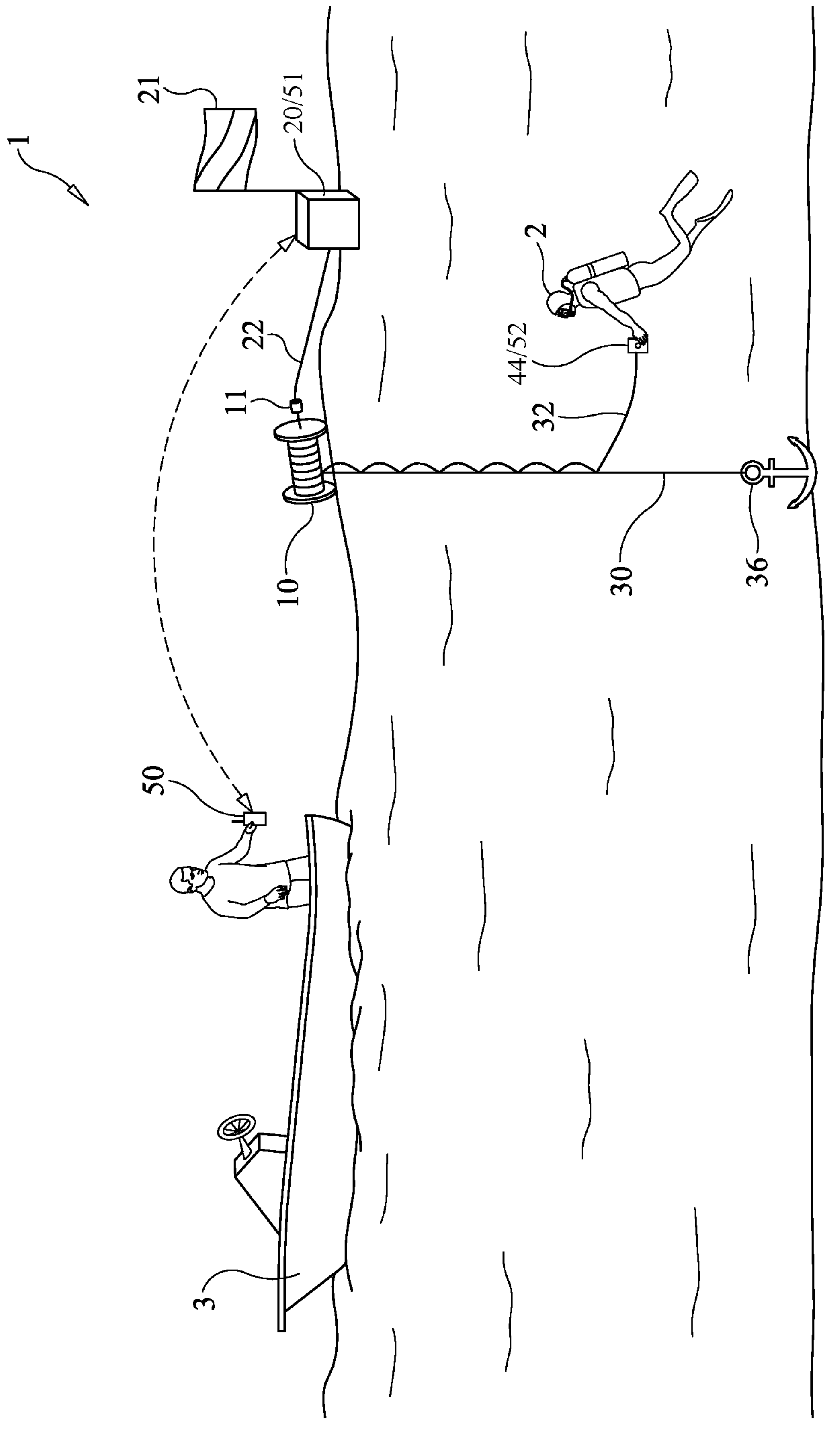
FIG. 2 is a line drawing evidencing an alternate embodiment of the system of FIG. 1, but with a separate float for transmission to a boat-based receiver, and with the underwater communication line attached to the underwater tending line externally and secured at predetermined intervals.

FIG. 2 indicates an alternate embodiment of the safety system of FIG. 1, also including a slip ring 11 adjacent to the buoy 10, a surface marker buoy 20 with dive flag 21 attached to the buoy with a tether 22, along which underwater communication line 32 is extended, and a sand anchor 36 attached to the buoy with underwater line 30 in order to fix the buoy to the sea bed. As foam will deform and reform, the slip ring may be sized to hold in place with friction only, or other materials could be used. Here the diver follows the underwater line 30 as a guide, and the underwater communications line 32 is separately strung along the line's length and potentially away from the anchor to a diver interface 44/node 3 51. The diver triggers his interface, which sends digital information via Node 3 up the underwater communication line to Node 2 (not pictured, located inside the surface marker buoy), which modulates the data into an RF signal, shown as a dotted line, sent to Node 1 50. Modulation technique will be determined to optimize reliability, range, bandwidth and security. It is also possible that signal may be transmitted using audio frequency modulation techniques such as DTMF.

Figure 3:
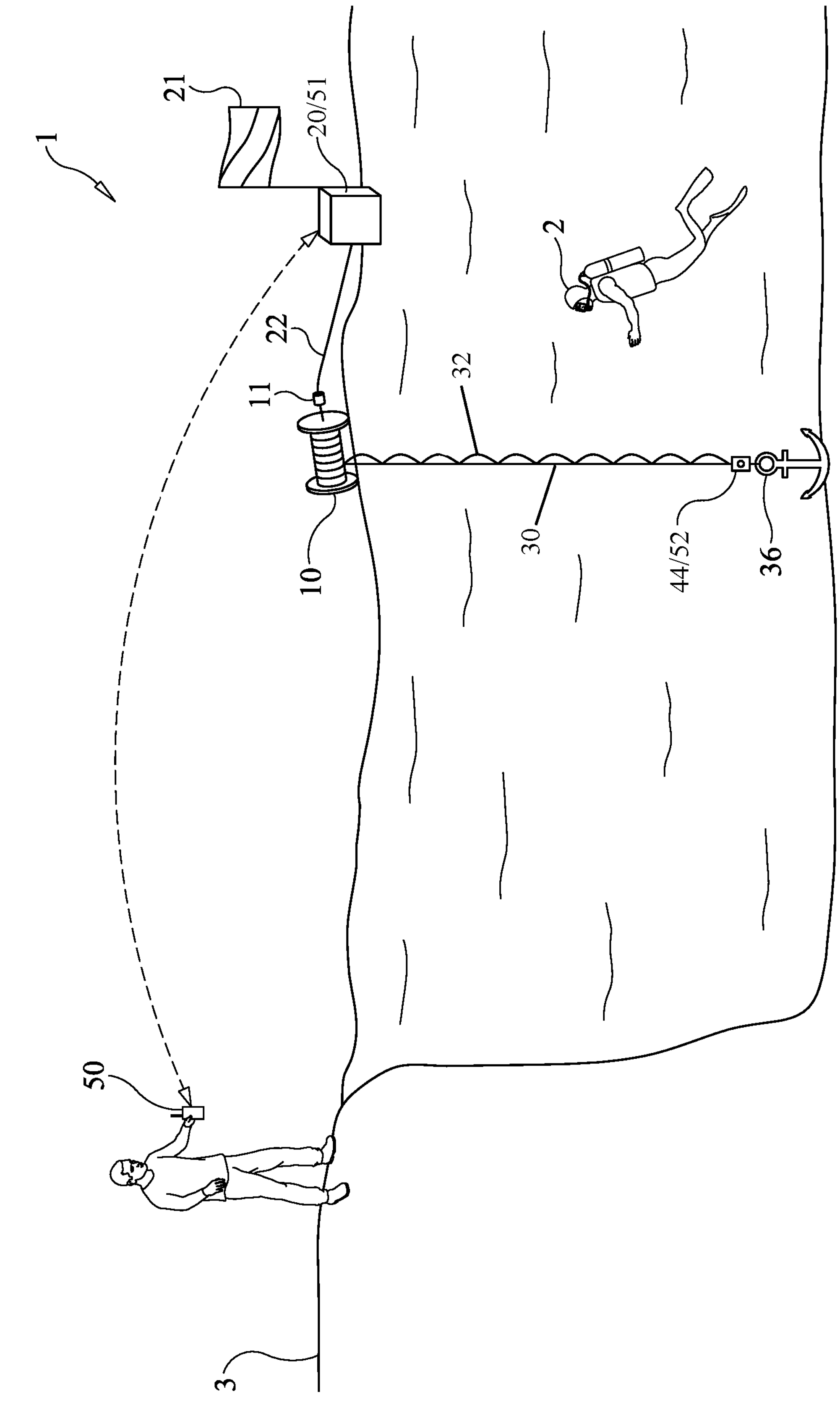
FIG. 3 is a line drawing evidencing an alternate embodiment of the system of FIG. 1, but with a separate float for transmission to a shore-based receiver, and with the underwater communication line contained within the underwater tending line.
Figure 4:
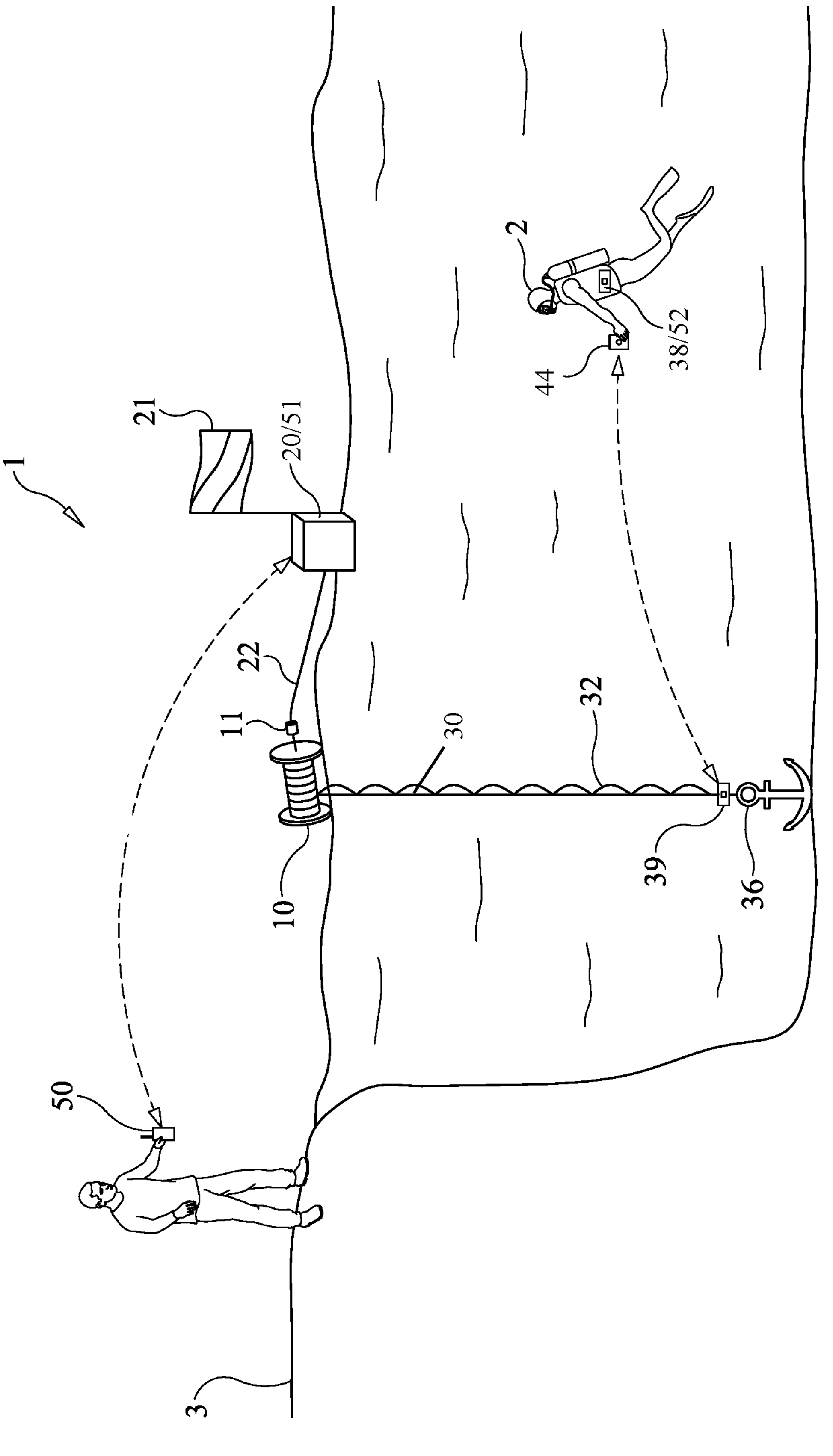
FIG. 4 is a line drawing evidencing an alternate embodiment of the system of FIG. 1, comprising acoustic modems for communication between an anchoring point at the bottom of the tending line and a diver, an underwater communication line attached to the underwater tending line externally and secured at predetermined intervals, and with a separate float for transmission to a shore-based receiver.

FIGS. 3 and 4 are line drawings evidencing alternate embodiments of the system of FIG. 1 for wired communication between the diver and/or anchor point to the primary flotation buoy. These embodiments include variations described in other paragraphs such as various means of the underwater communications line in relation to the underwater tending line and transmission to shore.

FIG. 3 indicates a similar embodiment to FIG. 2, except that the boat 3 has been removed in favor of a Node 1 50 that is instead positioned on a shoreline. Also, the diver interface 44/Node 3 52 is attached to the underwater communication line 32 and secured to underwater line 30 in this iteration.

FIG. 4 is a line drawing evidencing an alternate embodiment of the system of FIG. 1, comprising a first acoustic modem 38/Node 3 52 with the diver 2 and a second acoustic modem 39 attached to the underwater communication line and submerged beneath the flotation buoy 10 slip and ring 11. This allows the diver to communicate wirelessly with the wired second acoustic modem. In one possible embodiment, not pictured, an acoustic modem ring 38A surrounds the buoy stem 13, with the ring attached to an acoustic modem line 38B that tethers the surface acoustic modem to the ring and then to the electronics package. With this design, the buoy stem can spin inside the modem ring, allowing the second acoustic modem to remain submerged while the buoy pays out or retracts line. Other methods of attaching the surface acoustic modem to the buoy and electronics package are also available.

Figure 5:
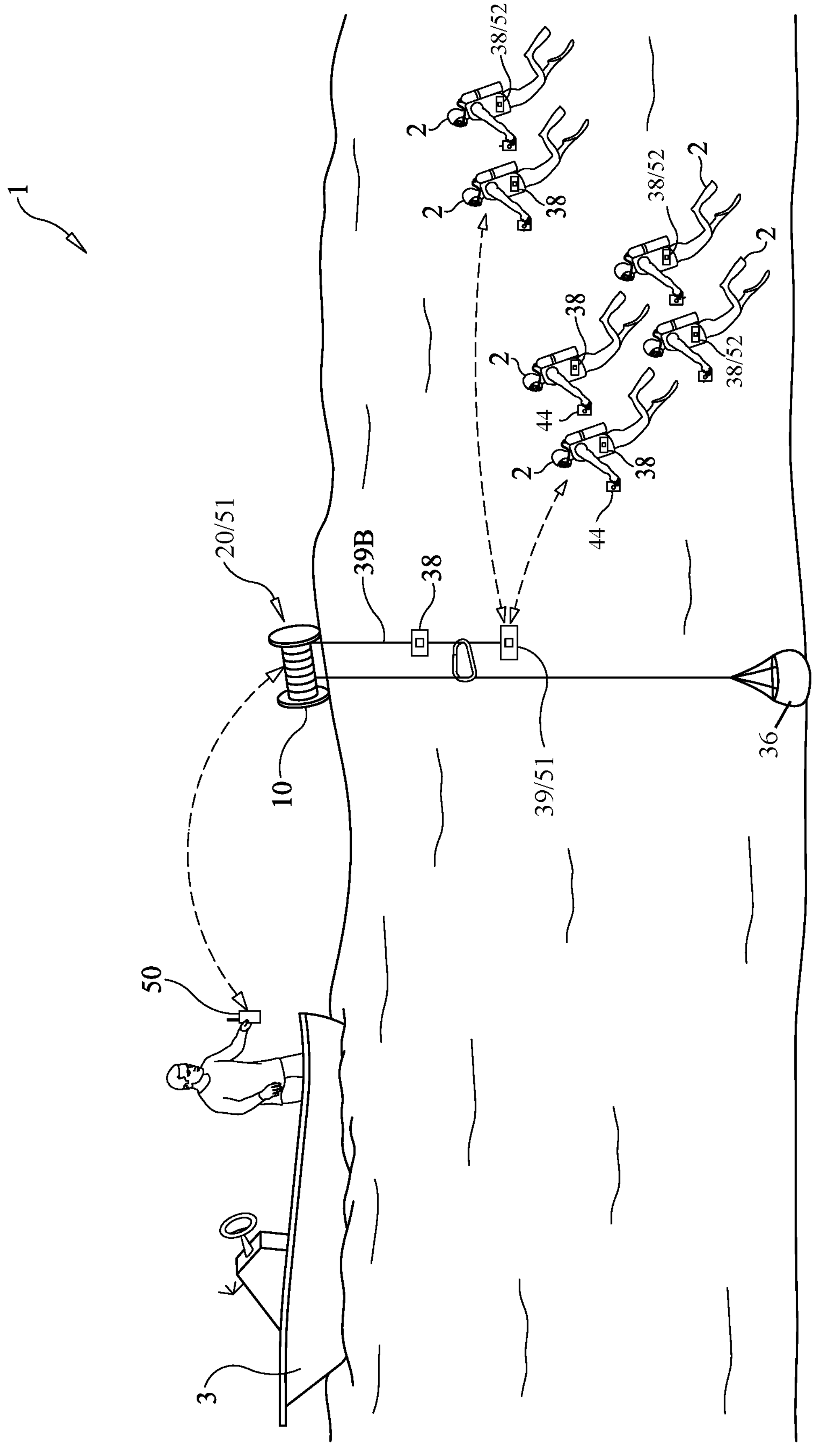
FIG. 5 is a line drawing evidencing an alternate embodiment of the system of FIG. 1, comprising acoustic modems for communication between a transceiver suspended from the flotation buoy and multiple divers, with an alternate embodiment for securing the transceiver and acoustic modem components, and an alternative embodiment of an anchoring system.
Figure 6:
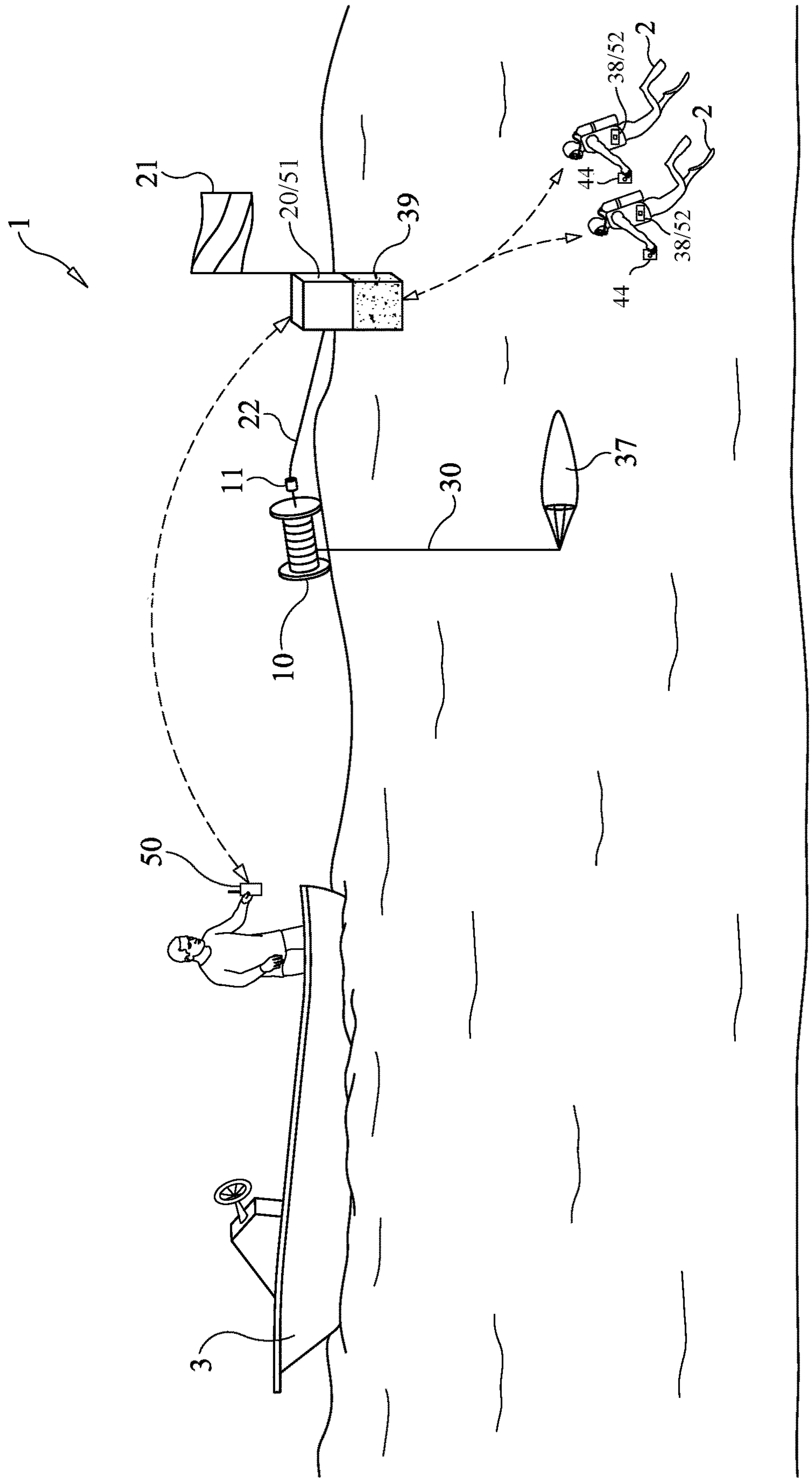
FIG. 6 is a line drawing evidencing an alternate embodiment of the system of FIG. 1, comprising acoustic modems for communication between a separate float for transmission to a boat-based receiver that also has a component for acoustic communication to multiple divers, as well as a drogue suspended from the flotation reel.

FIGS. 5 and 6 are line drawings evidencing alternative embodiments of FIG. 4 with variations in configuration for the sand anchor 36. In particular, FIG. 5 shows anchor 36 embodied as a sand anchor, transmission to multiple divers 2, each in communication with a first acoustic modem 38/Node 3 52 in communication with a second acoustic modem 39 and acoustic modem line 39B at the surface, along with various means of configuring transmissions to a boat 3 or shore.

FIG. 6 shows indicates a deep water dive utilizing a droghe 37 as a sea anchor. The acoustic modem 38 interfaced inside the buoy 10 receives the digital information through water from the acoustic modem 38/Node 3 52 on the divers 2, and relays it to Node 2 51, located inside separate surface marker 20 with flag 21 is also connected to the buoy with a tether 22, and which modulates the data into an RF signal sent to Node 1 50. A. The two divers 2, are each in communication with a first acoustic modem 38/Node 3, which in turn communicates with a second acoustic modem 39 at the surface, which second acoustic modem is wired to Node 2.

Figure 7A:
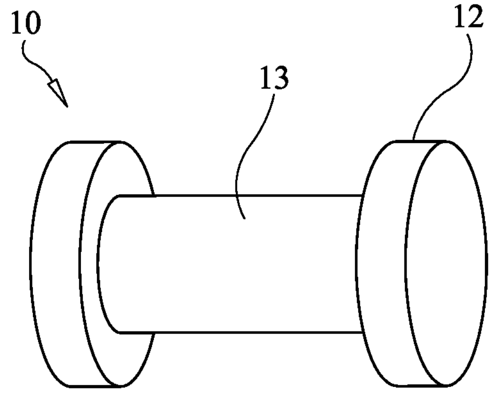
FIGS. 7A-7B are line drawings evidencing the flotation buoy of FIG. 1, including a slip ring to contain electronic communications equipment.
Figure 7B:
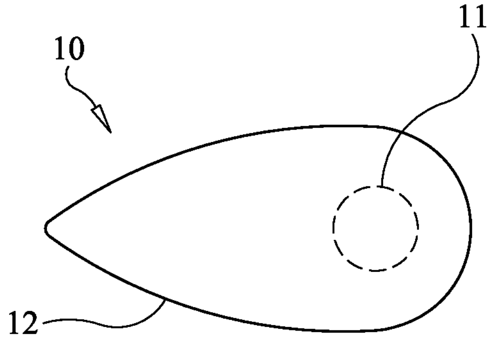

FIGS. 7A-7B show the flotation buoy 10 of FIG. 1, including a slip ring to contain electronic communications equipment. FIG. 7A gives a side view of the flotation buoy, evidencing the stem 13 component that connects the two tear-shaped caps 12 at either end of the stem. The tear shape of the caps will allow for the stem to operate as a reel, paying out line as the diver descends, but will hold the stem stable when no such downward pull is being applied. Alternate embodiments for the end caps include different shapes that allow for differences in tension required on the underwater tending line for a revolution of the flotation buoy. The stem could also consist of different materials or shapes for a particular desired characteristic.

FIG. 7B shows an end view of the flotation buoy 10, fully showing the tear drop shape of the visible end cap 12. The footprint area of the slip ring 11, centered within the stem 13 (not pictured) and containing the electronic communication components 50 (not pictured) is indicated in broken lines.

Figure 8:
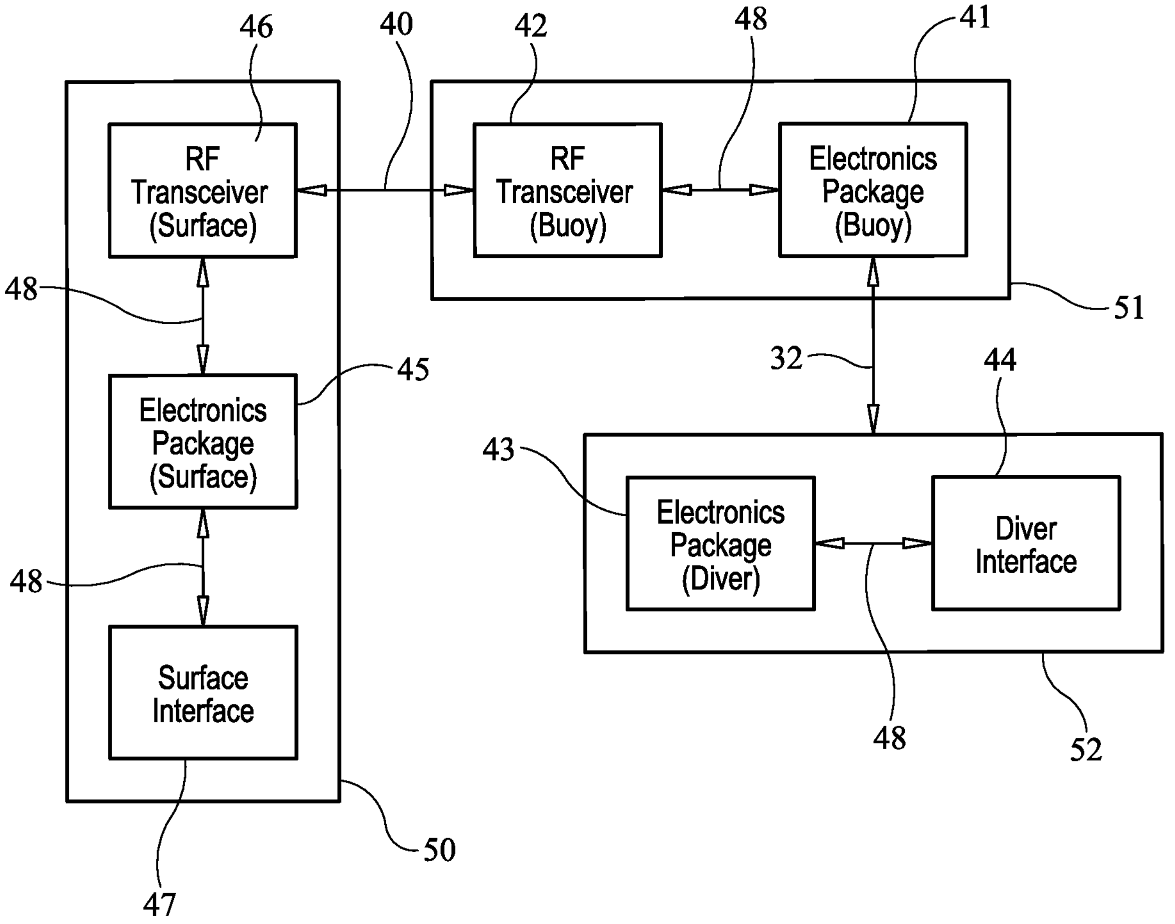
FIG. 8 is a schematic drawing evidencing the electronic components and wired interfaces of the diving safety system of FIG. 1.

FIG. 8 is a schematic drawing of the fully-wired electronic communications mechanism of the disclosed diving safety system. In drawing, Node 1 refers to the interface system 50 for surface users comprising an RF transceiver (surface) 46, surface interface 47 and electronics package (surface) each connected with a wired connection 48. Node 2 refers to the slip ring 11 within the flotation buoy (not pictured), and comprises an RF transceiver (buoy) 42 that is in wired communication with RF transceiver (surface) 46 via above water communication line 40 and also connected via wired connection 48 with electronics package (buoy) 41. Node 3 refers to the underwater diver electronics package 52, connected to Node 2 via underwater communication line 32, and comprising electronics package (diver) 43, connected to diver interface 44 via wired connection 48.

As such, a communication originating at Node 3 underwater may be electronically communicated to Node 2 at the buoy and thence to a surface user at Node 1, likely on board a boat or at the shore.

In each iteration, the RF transceiver 42,46 is a standard communication component containing both a transmitter and receiver for Radio Frequency (RF) signals. Each electronics package 41,43,45 comprises at least a microcontroller with a memory and processor, as well as a digital logic circuit. The surface interface 47 is preferably embodied as an audio speaker and/or video screen, and the diver interface 44 is embodied as an underwater microphone, camera, tablet or smartwatch, or button that can be used for morse code.

Figure 9:
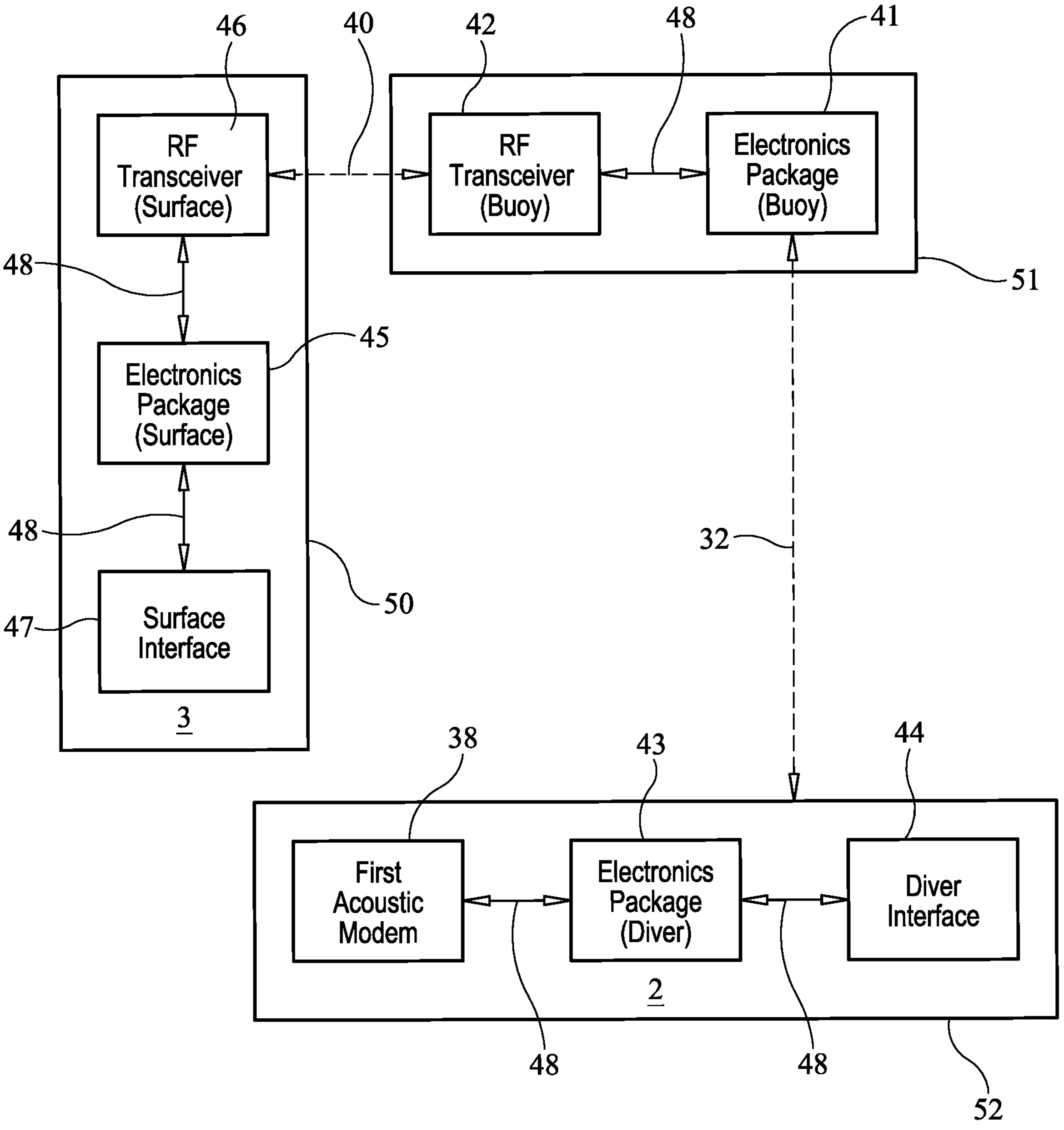
FIG. 9 is a schematic drawing evidencing the electronic components and wireless interfaces of the diving safety system of FIG. 1.

FIG. 9 is a second schematic drawing of the system pictured in FIG. 4, also comprising a pair of acoustic modems 38, a first modem submerged below Node 2 (buoy) 51 and interfaced with the Electronics package (buoy) 41 via a serial wired connection 48, and a second submerged modem at Node 3 (diver) 52, interfaced with the Electronics package (diver) 43 via another serial wired connection 48. These modems will share information between them on a wireless basis. Further, the RF transceiver (buoy) 42 will send and receive such information in the form of radio waves and thus be able to communicate wirelessly with the RF transceiver (surface) 46.

LIST OF REFERENCE NUMBERS

1 Diving safety system
2 Diver
3 Boat/shore
10 Flotation buoy
11 Slip ring
12 Buoy caps
13 Buoy stem
20 Surface marker buoy
21 Dive flag
22 Tether
30 Underwater line
31 Anchor
32 Underwater communication line

33 Transmitter
34 Panic button (component of diver interface 44)
35 Microphone
36 Sand anchor
37 Droghe
38 First acoustic modem
39 Second acoustic modem
39A Acoustic modem ring
39B Acoustic modem line
40 Above water communication line
41 Electronics package (buoy)
42 RF Transceiver (buoy)
43 Electronics package (diver)
44 Diver interface
45 Electronics package (surface)
46 RF Transceiver (surface)
47 Surface interface
48 Wired connection
50 Node 1 (boat/shore)
51 Node 2 (water surface)
52 Node 3 (underwater)

Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A diving safety system comprising:

a floatation buoy comprising a cylindrical stem connecting two tear drop-shaped caps, one at either end of the cylindrical stem, and a slip ring running through a hollow in the cylindrical stem, such slip ring containing electronic communications components, wherein the cylindrical stem pays out or retrieves line upon turning of the flotation buoy and the electronic communications components comprise a receiver for incoming underwater wired or wireless transmissions, an electronics package comprising a microcontroller and digital logic circuit above-water transmitter for outgoing wired or wireless transmissions, a surface marker buoy containing location equipment, an underwater line, a diver-based underwater transmitter with a connected diver interface and an anchor or drogue, wherein the surface marker buoy receives and processes electronic communications from an underwater transmitter with a submerged diver and relays such communications to third parties above water.

2. The diving safety system of claim 1, wherein the surface marker buoy is tethered to the flotation buoy.

3. The diving safety system of claim 1, wherein the location equipment comprises one or more of a flag, a strobe light, an audio speaker and a GPS unit.

4. The diving safety system of claim 3, wherein the GPS unit is connected to the electronic communications components and thereby periodically broadcasts location coordinates.

5. The diving safety system of claim 1, wherein the underwater transmitter is a wired transmitter attached to the connected diver interface and/or a microphone.

6. The diving safety system of claim 1, wherein the connected diver interface comprises a panic button.

7. The diving safety system of claim 1, wherein the underwater transmitter is a first acoustic modem in communication with a second acoustic modem, which second acoustic modem is submerged on or near the flotation buoy or the surface marker buoy and interfaces with the electronic communications components of the flotation buoy.

8. A method of using the diving safety system of claim 1, wherein the diver initiates a transmission with the underwater transmitter to the receiver in the flotation buoy or the surface marker buoy, which transmission is further transmitted by the above-water transmitter to one or more third parties.

* * * * *